US012573059B2

(12) United States Patent
Bae et al.

(10) Patent No.: US 12,573,059 B2
(45) Date of Patent: Mar. 10, 2026

(54) METHOD AND SYSTEM FOR 2D MOTION TRACKING OF A SUBJECT

(71) Applicant: JINTRONIX, INC., Seattle, WA (US)

(72) Inventors: Sung Jun Bae, Verdun (CA); Nicholas Kornek, Montreal (CA)

(73) Assignee: Lucida Health Inc., Seattle, WA (US)

( * ) Notice: Subject to any disclaimer, the term of this patent is extended or adjusted under 35 U.S.C. 154(b) by 425 days.

(21) Appl. No.: 18/245,011

(22) PCT Filed: Sep. 15, 2021

(86) PCT No.: PCT/US2021/050362
§ 371 (c)(1),
(2) Date: Mar. 13, 2023

(87) PCT Pub. No.: WO2022/060765
PCT Pub. Date: Mar. 24, 2022

(65) Prior Publication Data
US 2023/0386053 A1      Nov. 30, 2023

Related U.S. Application Data

(60) Provisional application No. 63/078,615, filed on Sep. 15, 2020.

(51) Int. Cl.
*G06T 7/246* (2017.01)
*A63B 71/06* (2006.01)

(52) U.S. Cl.
CPC .......... *G06T 7/248* (2017.01); *A63B 71/0619* (2013.01); *G06T 2207/30196* (2013.01)

(58) Field of Classification Search
CPC .......... G06T 7/248; G06T 2207/30196; A63B 71/0619
See application file for complete search history.

(56) References Cited

U.S. PATENT DOCUMENTS

2011/0080336 A1* 4/2011 Leyvand ................. G06F 3/017
                                                             382/103
2014/0125767 A1* 5/2014 Bell ...................... H04N 13/106
                                                             348/46

(Continued)

OTHER PUBLICATIONS

Notification of Transmittal of the International Search Report and the Written Opinion of the International Search Authority, PCT/US21/50362, Dec. 16, 2021.

*Primary Examiner* — Pinalben Patel
(74) *Attorney, Agent, or Firm* — Dawn-Marie Bey; Bey & Cotropia PLLC

(57) ABSTRACT

There is provided a method and system for 2D motion tracking of a subject engaging in physical exercise using a 2D camera. An image including a portion of a body of the subject is received and a first and a second point on the body are detected. A reference distance between the first and second point is determined, and a reference ratio is calculated based on the reference distance and at least one of the height and the width of the image. The first and second point are mapped into virtual space based on the reference ratio to obtain a first and second virtual point. A movement of at least one of the first and second point is detected in another image and mapped to a movement of a corresponding one of the first and second virtual point in virtual space which is output on a display interface.

20 Claims, 8 Drawing Sheets

700 receiving, from the camera, an image, the image comprising at least a portion of body of a subject — 802 detecting a first point and a second point on the at least portion of the body of the subject in the image — 804 determining a reference distance between the first point and the second point in the image — 806 calculating, based on the reference distance and the at least one of a height of the image and a width of the image, a reference ratio — 808 receiving a target reference ratio associated with a given virtual activity — 810 in response to the reference ratio being equal to the target reference ratio, receiving a third point on the at least portion of the body of the subject — 812 receiving a target range associated with the given virtual activity for the third point — 814 in response to the third point being within the target range: initializing the given virtual activity. — 816

(56)　　　　　　References Cited

U.S. PATENT DOCUMENTS

2016/0034767 A1*　2/2016　Saptharishi ............ H04N 7/188
　　　　　　　　　　　　　　　　　　　　　382/103
2020/0222757 A1*　7/2020　Yang ..................... G06V 40/23
2023/0218948 A1*　7/2023　Yang ..................... G06V 20/20

* cited by examiner

700

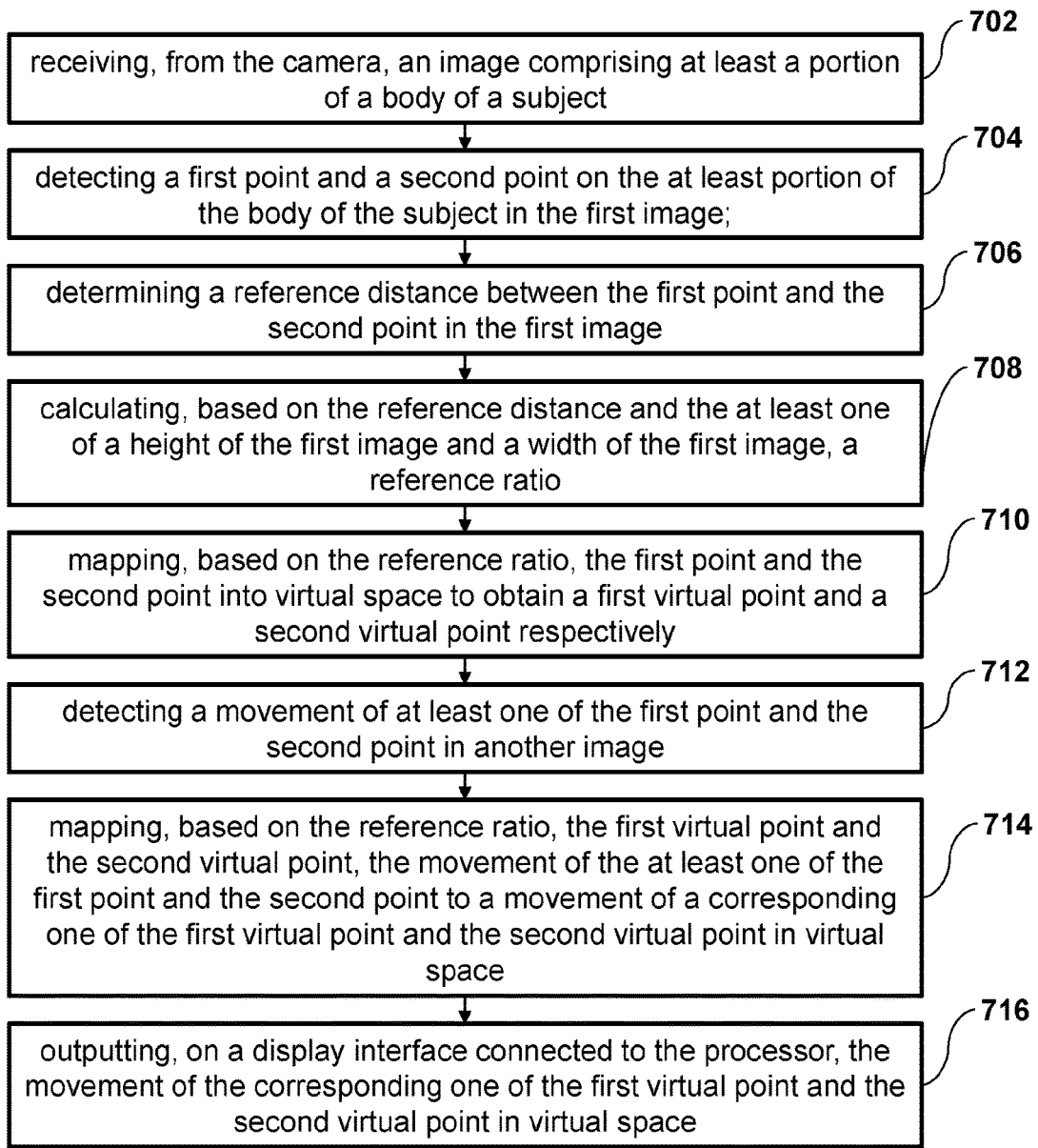

702 receiving, from the camera, an image comprising at least a portion of a body of a subject

704 detecting a first point and a second point on the at least portion of the body of the subject in the first image;

706 determining a reference distance between the first point and the second point in the first image

708 calculating, based on the reference distance and the at least one of a height of the first image and a width of the first image, a reference ratio

710 mapping, based on the reference ratio, the first point and the second point into virtual space to obtain a first virtual point and a second virtual point respectively

712 detecting a movement of at least one of the first point and the second point in another image

714 mapping, based on the reference ratio, the first virtual point and the second virtual point, the movement of the at least one of the first point and the second point to a movement of a corresponding one of the first virtual point and the second virtual point in virtual space

716 outputting, on a display interface connected to the processor, the movement of the corresponding one of the first virtual point and the second virtual point in virtual space

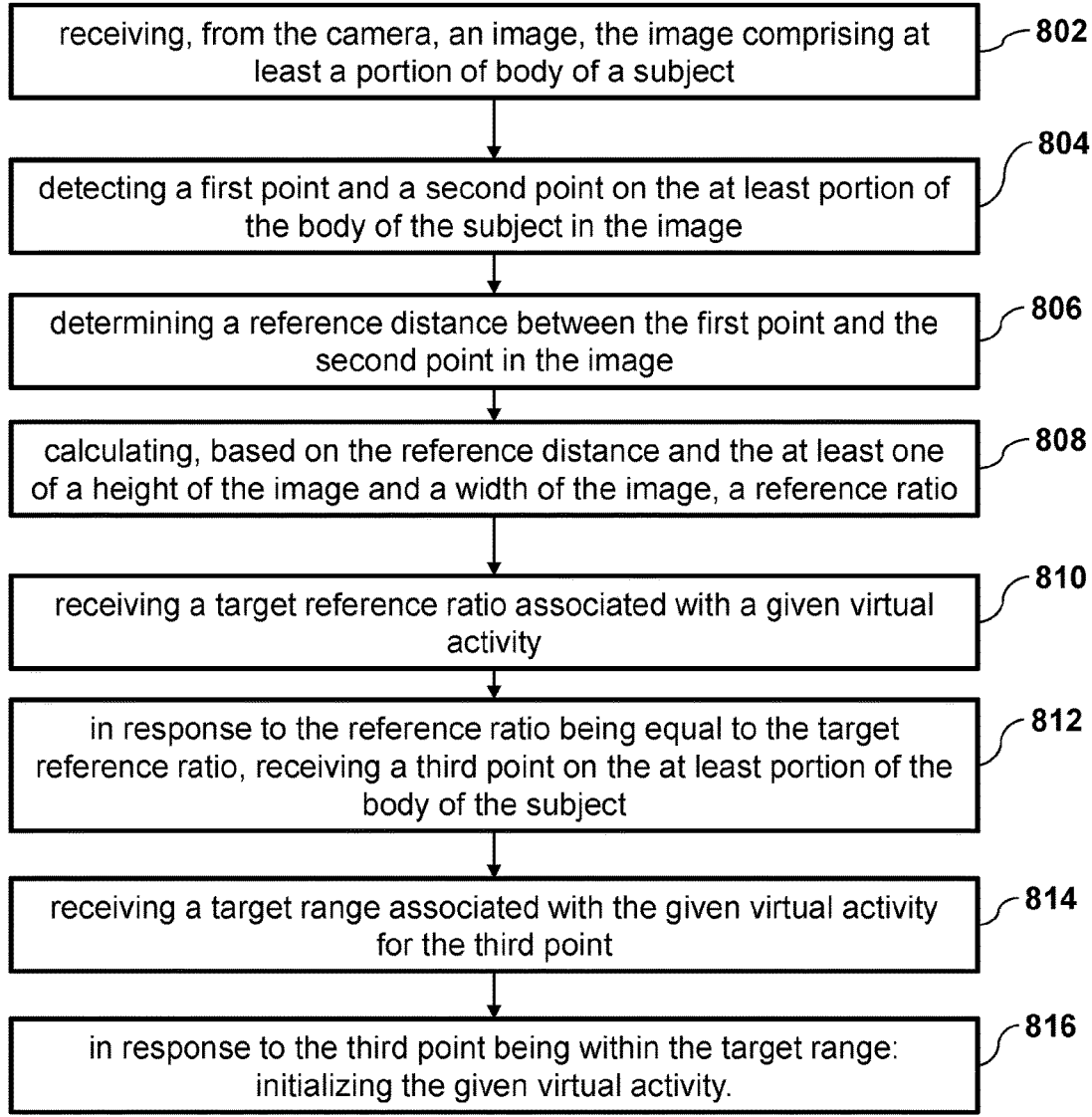

receiving, from the camera, an image, the image comprising at least a portion of body of a subject — 802 detecting a first point and a second point on the at least portion of the body of the subject in the image — 804 determining a reference distance between the first point and the second point in the image — 806 calculating, based on the reference distance and the at least one of a height of the image and a width of the image, a reference ratio — 808 receiving a target reference ratio associated with a given virtual activity — 810 in response to the reference ratio being equal to the target reference ratio, receiving a third point on the at least portion of the body of the subject — 812 receiving a target range associated with the given virtual activity for the third point — 814 in response to the third point being within the target range: initializing the given virtual activity. — 816

Figure 8

METHOD AND SYSTEM FOR 2D MOTION TRACKING OF A SUBJECT

CROSS-REFERENCE TO RELATED APPLICATIONS

The present application claims the benefit of U.S. Provisional Patent Application No. 63/078,615, filed Sep. 15, 2020, which is incorporated by reference herein in its entirety.

FIELD

The present technology relates to the field of physical rehabilitation or physical exercise for patients or individuals, and more particularly to methods and systems for 2D motion tracking of a subject engaging in physical exercise using a 2D camera.

BACKGROUND

There currently exist a number of software-based solutions to support physical rehabilitation or physical exercise. They include various activities and games that harness motion tracking systems such as the Nintendo Wii™ and Microsoft Kinect™.

Many such commercial motion tracking systems output 3D joint data, which can be incorporated into an interactive module for the purposes of engaging an individual in physical exercise. However, such systems require the purchase of specialized sensors for tracking the user in 3D, which may be expensive and difficult to install and use. On the other hand, 2D cameras, such as frontal facing cameras included in phones, tablets, laptops or webcams are widely available.

However, using 2D data to track movements of a user poses some challenges.

Therefore, there is a need an improved method and system for tracking motion of a subject.

SUMMARY

It is an object of the present technology to alleviate at least some of the limitations present in the prior art. One or more embodiments of the present technology may provide and/or broaden the scope of approaches to and/or methods of achieving the aims and objects of the present technology.

In accordance with a broad aspect of the present technology, there is provided a method for tracking a subject using a camera, the method is executed by a processor operatively connected to the camera. the method comprises: receiving, from the camera, an image including at least a portion of a body of the subject, detecting a first point and a second point on the at least portion of the body of the subject in the first image, determining a reference distance between the first point and the second point in the first image. The method comprises calculating, based on the reference distance and the at least one of a height of the first image and a width of the first image, a reference ratio, mapping, based on the reference ratio, the first point and the second point into virtual space to obtain a first virtual point and a second virtual point respectively, detecting a movement of at least one of the first point and the second point in another image. The method comprises mapping, based on the reference ratio, the first virtual point and the second virtual point, the movement of the at least one of the first point and the second point to a movement of a corresponding one of the first virtual point and the second virtual point in virtual space, and outputting, on a display interface connected to the processor, the movement of the corresponding one of the first virtual point and the second virtual point in virtual space.

In one or more embodiments of the method, the method further comprises, prior to said mapping the movement of the at least one of the first point and the second point to the movement of the corresponding one of the first virtual point and the second virtual point in virtual space: receiving a virtual space range, the virtual space range extending from a minimum virtual space value to a maximum virtual space value, said mapping the movement of the at least one of the first point and the second point to the movement of the corresponding one of the first virtual point and the second virtual point in virtual space is further based on the virtual space range.

In one or more embodiments of the method, the first point comprises a first joint on the at least portion of the body and the second point comprises a second joint on the at least portion of the body.

In one or more embodiments of the method, the camera comprises a webcam.

In one or more embodiments of the method, said detecting the first point and the second and said detecting the movement is executed by a machine learning algorithm having been trained therefor.

In accordance with a broad aspect of the present technology, there is provided a method for tracking a subject in 2D using a camera, the method is executed by a processor operatively connected to the camera. the method comprises: receiving, from the camera, an image, the image including at least a portion of body of a subject, detecting a first point and a second point on the at least portion of the body of the subject in the image, determining a reference distance between the first point and the second point in the image. The method comprises calculating, based on the reference distance and the at least one of a height of the image and a width of the image, a reference ratio, receiving a target reference ratio associated with a given virtual activity. In response to the reference ratio being equal to the target reference ratio: receiving a third point on the at least portion of the body of the subject, receiving a target range associated with the given virtual activity for the third point, and in response to the third point is within the target range: initializing the given virtual activity.

In one or more embodiments of the method, the first point comprises a first joint on the at least portion of the body and the second point comprises a second joint on the at least portion of the body.

In one or more embodiments of the method, said calculating the reference ratio comprises converting the reference distance and the at least one of the height of the image and the width of the image in normalized coordinate space.

In one or more embodiments of the method, the method further comprises, prior to said receiving the third point on the at least portion of the body of the subject: receiving a predetermined interval associated with the given activity, and calculating, based on the predetermined interval, the reference distance and the at least one of the height of the image and the width of the image, the target range.

In one or more embodiments of the method, the target range comprises a target horizontal range and a target vertical range.

In one or more embodiments of the method, the method further comprises, in response to the reference ratio is below the target reference ratio: providing, to an output interface connected to the processor, an indication to the subject to move further away from the camera.

In one or more embodiments of the method, the method further comprises, in response to the reference ratio is above the target reference ratio: providing, to the output interface connected to the processor, an indication to the subject to move closer to the camera.

In one or more embodiments of the method, the method further comprises, in response to the third point not is within the target range: providing, to the output interface connected to the processor, an indication to the subject to move further away from the camera.

In one or more embodiments of the method, the method further comprises, in response to the third point is not within the range: providing, to the output interface connected to the processor, an indication to the subject to move the camera.

In one or more embodiments of the method, the camera comprises a webcam.

In one or more embodiments of the method, the output interface comprises a display screen, and said providing the indication to the subject comprises displaying the indication to the subject on the display screen.

In one or more embodiments of the method, the first point comprises a left shoulder position of the subject and the second point comprises a right shoulder position of the subject.

In one or more embodiments of the method, the third point comprises a position of the head of the subject.

In one or more embodiments of the method, said detecting the first point, the second and the third point is executed by a machine learning algorithm having been trained therefor.

In accordance with a broad aspect of the present technology, there is provided a system for tracking a subject. the system comprises: a processor, a camera operatively connected to the processor, a non-transitory storage medium operatively connected to the processor, the non-transitory storage medium includes computer-readable instructions, the processor, upon executing the instructions, is configured for: receiving, from the camera, an image including at least a portion of a body of the subject, detecting a first point and a second point on the at least portion of the body of the subject in the first image, determining a reference distance between the first point and the second point in the first image. The processor is configured for calculating, based on the reference distance and the at least one of a height of the first image and a width of the first image, a reference ratio, mapping, based on the reference ratio, the first point and the second point into virtual space to obtain a first virtual point and a second virtual point respectively, detecting a movement of at least one of the first point and the second point in another image, mapping, based on the reference ratio, the first virtual point and the second virtual point, the movement of the at least one of the first point and the second point to a movement of a corresponding one of the first virtual point and the second virtual point in virtual space, and outputting, on a display interface connected to the processor, the movement of the corresponding one of the first virtual point and the second virtual point in virtual space.

In one or more embodiments of the system, the processor is further configured for, prior to said mapping the movement of the at least one of the first point and the second point to the movement of the corresponding one of the first virtual point and the second virtual point in virtual space: receiving a virtual space range, the virtual space range extending from a minimum virtual space value to a maximum virtual space value, said mapping the movement of the at least one of the first point and the second point to the movement of the corresponding one of the first virtual point and the second virtual point in virtual space is further based on the virtual space range.

In one or more embodiments of the system, the first point comprises a first joint on the at least portion of the body and the second point comprises a second joint on the at least portion of the body.

In one or more embodiments of the system, the camera comprises a webcam.

In one or more embodiments of the system, said detecting the first point and the second and said detecting the movement is executed by a machine learning algorithm having been trained therefor.

In accordance with a broad aspect of the present technology, there is provided a system for tracking a subject in 2D. the system comprises: a processor, a camera operatively connected to the processor, a non-transitory storage medium operatively connected to the processor, the non-transitory storage medium includes computer-readable instructions, the processor, upon executing the instructions, is configured for: receiving, from the camera, an image, the image including at least a portion of body of a subject, detecting a first point and a second point on the at least portion of the body of the subject in the image, and determining a reference distance between the first point and the second point in the image. The processor is configured for calculating, based on the reference distance and the at least one of a height of the image and a width of the image, a reference ratio, receiving a target reference ratio associated with a given virtual activity, in response to the reference ratio is equal to the target reference ratio: receiving a third point on the at least portion of the body of the subject, receiving a target range associated with the given virtual activity for the third point, and in response to the third point is within the target range: initializing the given virtual activity.

In one or more embodiments of the system, the first point comprises a first joint on the at least portion of the body and the second point comprises a second joint on the at least portion of the body.

In one or more embodiments of the system, said calculating the reference ratio comprises converting the reference distance and the at least one of the height of the image and the width of the image in normalized coordinate space.

In one or more embodiments of the system, the processor is further configured for, prior to said receiving the third point on the at least portion of the body of the subject: receiving a predetermined interval associated with the given activity, and calculating, based on the predetermined interval, the reference distance and the at least one of the height of the image and the width of the image, the target range.

In one or more embodiments of the system, the target range comprises a target horizontal range and a target vertical range.

In one or more embodiments of the system, the processor is further configured for, in response to the reference ratio is below the target reference ratio: providing, to an output interface connected to the processor, an indication to the subject to move further away from the camera.

In one or more embodiments of the system, the processor is further configured for, in response to the reference ratio is above the target reference ratio: providing, to the output interface connected to the processor, an indication to the subject to move closer to the camera.

In one or more embodiments of the system, the processor is further configured for, in response to the third point not is within the target range: providing, to the output interface connected to the processor, an indication to the subject to move further away from the camera.

In one or more embodiments of the system, the processor is further configured for, in response to the third point not is within the range: providing, to the output interface connected to the processor, an indication to the subject to move the camera.

In one or more embodiments of the system, the camera comprises a webcam.

In one or more embodiments of the system, the output interface comprises a display screen, and said providing the indication to the subject comprises displaying the indication to the subject on the display screen.

In one or more embodiments of the system, the first point comprises a left shoulder position of the subject and the second point comprises a right shoulder position of the subject.

In one or more embodiments of the system, the third point comprises a position of the head of the subject.

In one or more embodiments of the system, said detecting the first point, the second and the third point is executed by a machine learning algorithm having been trained therefor.

Definitions

In the context of the present specification, a "server" is a computer program that is running on appropriate hardware and is capable of receiving requests (e.g., from electronic devices) over a network (e.g., a communication network), and carrying out those requests, or causing those requests to be carried out. The hardware may be one physical computer or one physical computer system, but neither is required to be the case with respect to the present technology. In the present context, the use of the expression a "server" is not intended to mean that every task (e.g., received instructions or requests) or any particular task will have been received, carried out, or caused to be carried out, by the same server (i.e., the same software and/or hardware); it is intended to mean that any number of software elements or hardware devices may be involved in receiving/sending, carrying out or causing to be carried out any task or request, or the consequences of any task or request; and all of this software and hardware may be one server or multiple servers, both of which are included within the expressions "at least one server" and "a server".

In the context of the present specification, "electronic device" is any computing apparatus or computer hardware that is capable of running software appropriate to the relevant task at hand. Thus, some (non-limiting) examples of electronic devices include general purpose personal computers (desktops, laptops, netbooks, etc.), mobile computing devices, smartphones, and tablets, and network equipment such as routers, switches, and gateways. It should be noted that an electronic device in the present context is not precluded from acting as a server to other electronic devices. The use of the expression "an electronic device" does not preclude multiple electronic devices being used in receiving/ sending, carrying out or causing to be carried out any task or request, or the consequences of any task or request, or steps of any method described herein. In the context of the present specification, a "client device" refers to any of a range of end-user client electronic devices, associated with a user, such as personal computers, tablets, smartphones, and the like.

In the context of the present specification, the expression "computer readable storage medium" (also referred to as "storage medium" and "storage") is intended to include non-transitory media of any nature and kind whatsoever, including without limitation RAM, ROM, disks (CD-ROMs, DVDs, floppy disks, hard drivers, etc.), USB keys, solid state-drives, tape drives, etc. A plurality of components may be combined to form the computer information storage media, including two or more media components of a same type and/or two or more media components of different types.

In the context of the present specification, a "database" is any structured collection of data, irrespective of its particular structure, the database management software, or the computer hardware on which the data is stored, implemented or otherwise rendered available for use. A database may reside on the same hardware as the process that stores or makes use of the information stored in the database or it may reside on separate hardware, such as a dedicated server or plurality of servers.

In the context of the present specification, the expression "information" includes information of any nature or kind whatsoever capable of being stored in a database. Thus information includes, but is not limited to audiovisual works (images, movies, sound records, presentations etc.), data (location data, numerical data, etc.), text (opinions, comments, questions, messages, etc.), documents, spreadsheets, lists of words, etc.

In the context of the present specification, unless expressly provided otherwise, an "indication" of an information element may be the information element itself or a pointer, reference, link, or other indirect mechanism enabling the recipient of the indication to locate a network, memory, database, or other computer-readable medium location from which the information element may be retrieved. For example, an indication of a document could include the document itself (i.e. its contents), or it could be a unique document descriptor identifying a file with respect to a particular file system, or some other means of directing the recipient of the indication to a network location, memory address, database table, or other location where the file may be accessed. As one skilled in the art would recognize, the degree of precision required in such an indication depends on the extent of any prior understanding about the interpretation to be given to information being exchanged as between the sender and the recipient of the indication. For example, if it is understood prior to a communication between a sender and a recipient that an indication of an information element will take the form of a database key for an entry in a particular table of a predetermined database containing the information element, then the sending of the database key is all that is required to effectively convey the information element to the recipient, even though the information element itself was not transmitted as between the sender and the recipient of the indication.

In the context of the present specification, the expression "communication network" is intended to include a telecommunications network such as a computer network, the Internet, a telephone network, a Telex network, a TCP/IP data network (e.g., a WAN network, a LAN network, etc.), and the like. The term "communication network" includes a wired network or direct-wired connection, and wireless media such as acoustic, radio frequency (RF), infrared and other wireless media, as well as combinations of any of the above.

In the context of the present specification, the words "first", "second", "third", etc. have been used as adjectives only for the purpose of allowing for distinction between the nouns that they modify from one another, and not for the purpose of describing any particular relationship between those nouns. Thus, for example, it should be understood that, the use of the terms "server" and "third server" is not intended to imply any particular order, type, chronology, hierarchy or ranking (for example) of/between the server, nor is their use (by itself) intended imply that any "second server" must necessarily exist in any given situation. Further, as is discussed herein in other contexts, reference to a "first" element and a "second" element does not preclude the two elements from being the same actual real-world element. Thus, for example, in some instances, a "first" server and a "second" server may be the same software and/or hardware, in other cases they may be different software and/or hardware.

Implementations of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of implementations of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where:

FIG. 7 depicts a flow chart of a method of 2D motion tracking position correction, in accordance with one or more non-limiting embodiments of the present technology.

FIG. 8 depicts a flow chart of a method of 2D motion tracking distance correction, in accordance with one or more non-limiting embodiments of the present technology.

DETAILED DESCRIPTION

Figure 1:
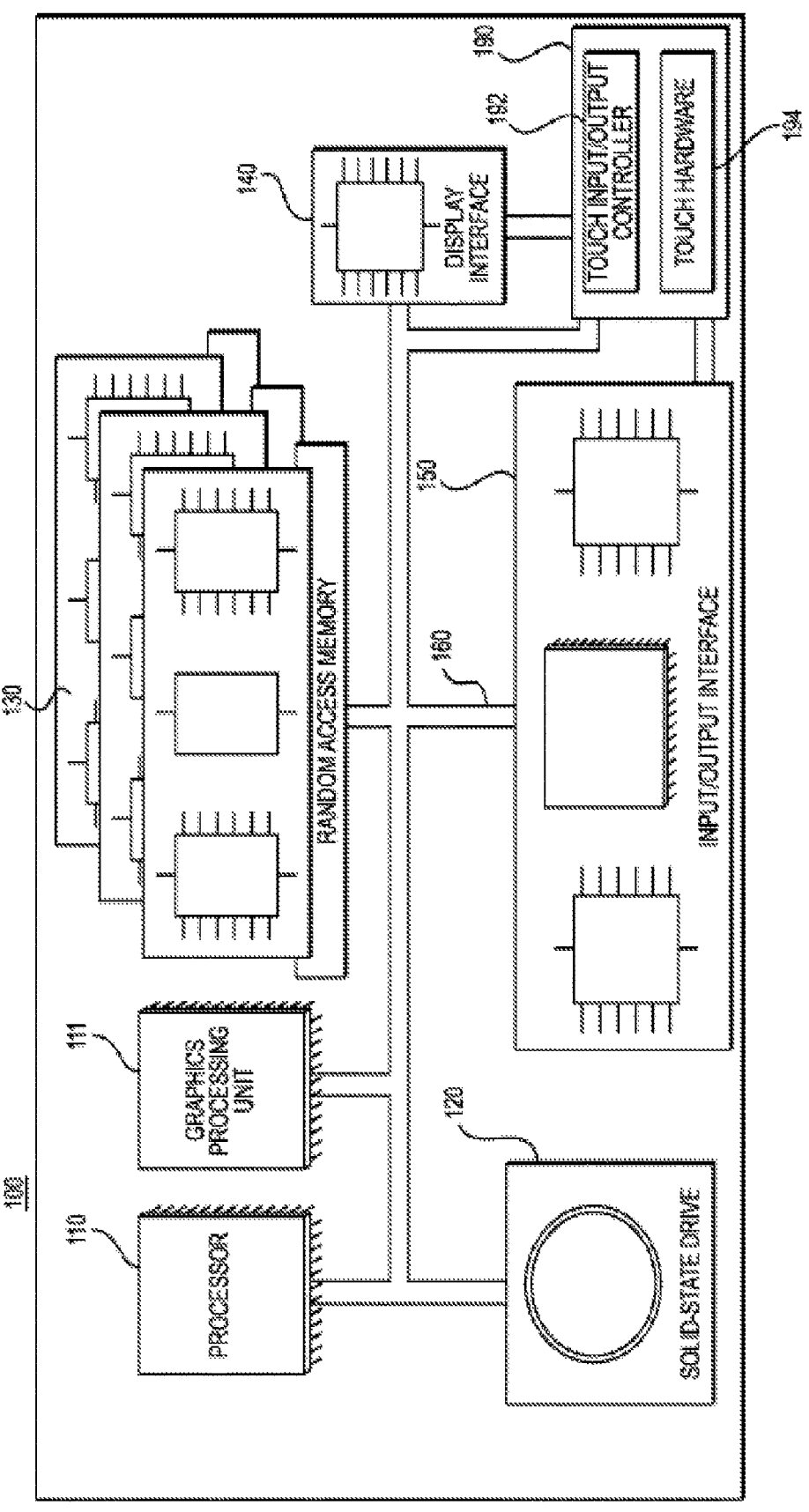
FIG. 1 depicts a schematic diagram of an electronic device, in accordance with one or more non-limiting embodiments of the present technology.

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

The functions of the various elements shown in the figures, including any functional block labeled as a "processor" or a "graphics processing unit", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In one or more non-limiting embodiments of the present technology, the processor may be a general purpose processor, such as a central processing unit (CPU) or a processor dedicated to a specific purpose, such as a graphics processing unit (GPU). Moreover, explicit use of the term "processor" or "controller" should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown.

With these fundamentals in place, we will now consider some non-limiting examples to illustrate various implementations of aspects of the present technology.

Electronic Device

Referring to FIG. 1, there is shown an electronic device 100 suitable for use with some implementations of the present technology, the electronic device 100 comprising various hardware components including one or more single or multi-core processors collectively represented by processor 110, a graphics processing unit (GPU) 111, a solid-state drive 120, a random access memory 130, a display interface 140, and an input/output interface 150.

Communication between the various components of the electronic device 100 may be enabled by one or more internal and/or external buses 160 (e.g. a PCI bus, universal serial bus, IEEE 1394 "Firewire" bus, SCSI bus, Serial-ATA bus, etc.), to which the various hardware components are electronically coupled.

The input/output interface 150 may be coupled to a touchscreen 190 and/or to the one or more internal and/or external buses 160. The touchscreen 190 may be part of the display. In one or more embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more internal and/or external buses 160. In one or more embodiments, the input/output interface 150 may be connected to a keyboard (not shown), a mouse (not shown) or a trackpad (not shown) allowing the user to interact with the electronic device 100 in addition or in replacement of the touchscreen 190.

According to implementations of the present technology, the solid-state drive 120 stores program instructions suitable for being loaded into the random-access memory 130 and executed by the processor 110 and/or the GPU 111. For example, the program instructions may be part of a library or an application.

The electronic device 100 may be implemented as a server, a desktop computer, a laptop computer, a tablet, a smartphone, a personal digital assistant or any device that may be configured to implement the present technology, as it may be understood by a person skilled in the art.

System

Figure 2:
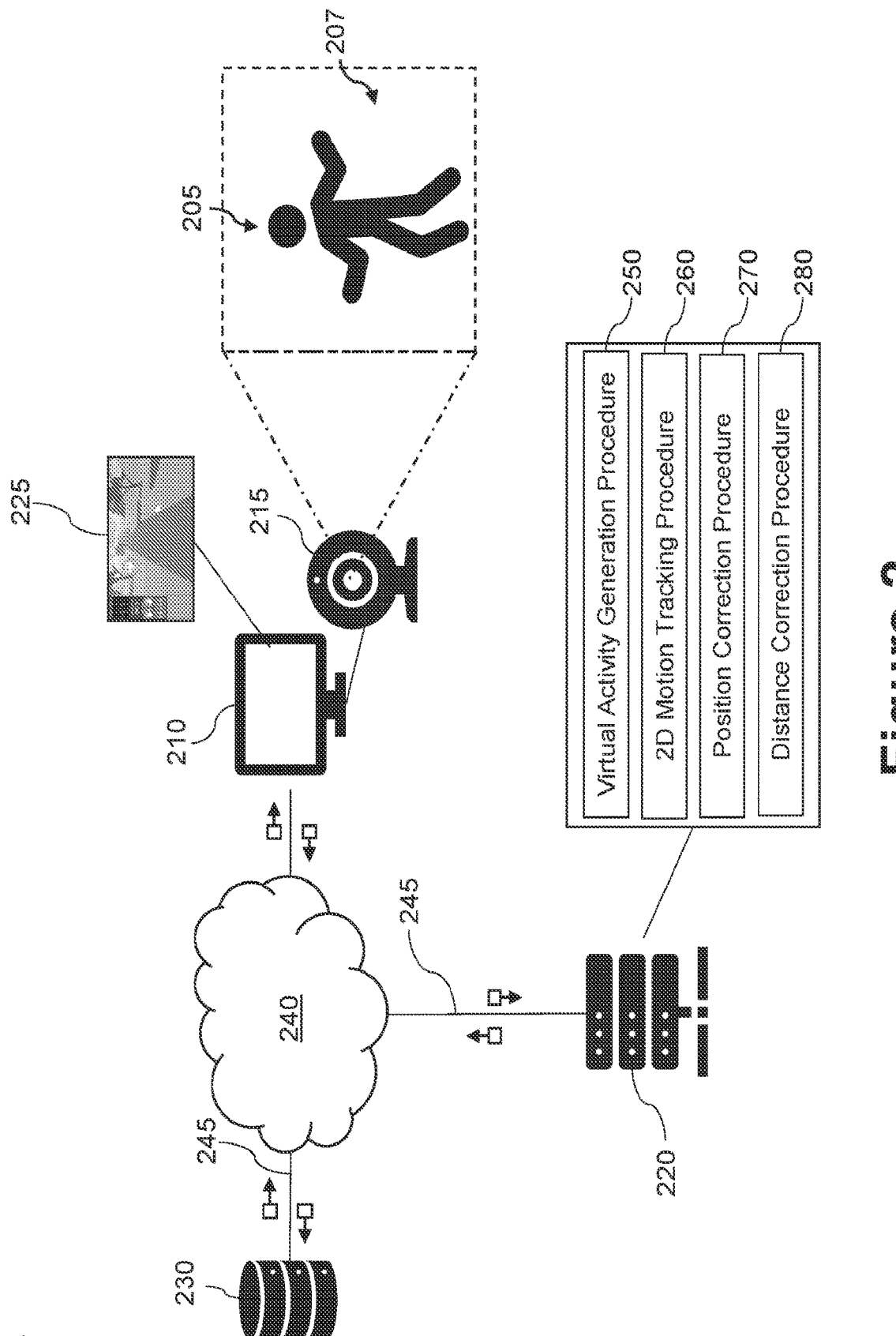
FIG. 2 depicts a schematic diagram of a system, in accordance with one or more non-limiting embodiments of the present technology.

Referring to FIG. 2, there is shown a schematic diagram of a system 200 suitable for implementing one or more non-limiting embodiments of the present technology. It is to be expressly understood that the system 200 as shown is merely an illustrative implementation of the present technology. Thus, the description thereof that follows is intended to be only a description of illustrative examples of the present technology. This description is not intended to define the scope or set forth the bounds of the present technology. In some cases, what are believed to be helpful examples of modifications to the system 200 may also be set forth below. This is done merely as an aid to understanding, and, again, not to define the scope or set forth the bounds of the present technology. These modifications are not an exhaustive list, and, as a person skilled in the art would understand, other modifications are likely possible. Further, where this has not been done (i.e., where no examples of modifications have been set forth), it should not be interpreted that no modifications are possible and/or that what is described is the sole manner of implementing that element of the present technology. As a person skilled in the art would understand, this is likely not the case. In addition, it is to be understood that the system 200 may provide in certain instances simple implementations of the present technology, and that where such is the case they have been presented in this manner as an aid to understanding. As persons skilled in the art would understand, various implementations of the present technology may be of a greater complexity.

The system 200 comprises inter alia a client device 210 connected to a camera 215 associated with a user 205, a server 220, and a database 230 communicatively coupled over a communications network 240.

Client Device

The system 200 comprises the client device 210. The client device 210 is associated with the user 205. As such, the client device 210 can sometimes be referred to as a "electronic device", "end user device" or "client electronic device". It should be noted that the fact that the client device 210 is associated with the user 205 does not need to suggest or imply any mode of operation—such as a need to log in, a need to be registered, or the like.

In one or more embodiments, the client device 210 comprises one or more components of the electronic device 100 such as one or more single or multi-core processors collectively represented by the processor 110, the graphics processing unit (GPU) 111, the solid-state drive 120, the random access memory 130, the display interface 140, and the input/output interface 150.

The client device 210 comprises the display interface 140 to display a virtual exercise interface 225 and provide feedback and instructions to the user 205, which may interact with the virtual exercise interface 225 via the camera 215. Additionally, the client device 210 may include an interface such a touchscreen (as part of the display interface 140) or a mouse and/or keyboard for interaction with the client device 210 and the virtual exercise interface 225.

In one or more alternative embodiments, the client device 210 provides feedback to the user 205 via another input/output interface, such as an audio interface.

In one or more embodiments, the client device 210 is implemented as a smartphone, a tablet, a laptop, a desktop computer, or the like.

In one or more other embodiments, the client device 210 may be a display device such as a TV. As a non-limiting example, the client device 210 may be a TV having smart TV functionalities and which may be configured to execute the virtual exercise interface 225.

The user 205 or subject 205 has a body 207 and may be located in an environment. The user 205 has physical access to the client device 210 and the camera 215. As a non-limiting example, the user 205 may be a patient in a hospital. As another non-limiting example, the user 205 may be an elderly person wanting to engage in physical activity at home or at a residence.

The user 205 uses and interacts the client device 210 and the webcam 215 to perform movements which may be part of an exercise routine such as a rehabilitation routine.

Camera

The client device 210 is connected to a camera 215. As such, the camera 215 may be part of the client device 210, i.e. integrated into the client device 210, or may be separate from the client device 210 and connected to the client device 210 via a wired or wireless communication link (not illustrated). It should be understood that the camera 215 may be any adequate visual image capturing device. As a non-limiting example, the camera 215 may be a front facing camera of a smartphone, a tablet or laptop. As another non-limiting example, the camera 215 may be a web camera (webcam) connected to the client device 210.

The camera 215 is configured to: (i) acquire/capture images and/or videos of the user 205; (ii) transmit the captured images and/or videos to the client device 210 and/or the server 220; and (iii) receive instructions from the client device 210 and/or the server 220.

In one or more embodiments, the camera 215 comprises a microphone (not illustrated) for capturing audio, however this does not need to be so in every embodiment of the present technology. It will be appreciated that the microphone may be part of the client device 210 or may be a separate component connected to the client device 210 or the camera 215.

In one or more embodiments, the camera 215 transmits images and/or videos in real-time. It will be appreciated that the images and/or videos may be transmitted in a compressed format.

The implementation of the camera 215 is well known in the art. The camera generally comprises one or more image sensors, optics including one or more lenses, application specific integrated circuit (ASIC), and an interface.

The camera 215 has a field of view, which is the angular extent of a given scene imaged by the camera 215. The field of view is a function of the optics of the camera 215, the imaging sensor(s) of the camera 215 as well as the digital processing performed by the camera 215 (and/or the client device 210).

The camera 215 is configured to capture images and/or videos at a camera resolution which depends on the field of view. As a non-limiting example, the camera 215 may capture images and/or videos at resolutions of 720×480 (0.346 megapixels), 1280×720 (0.922 megapixels or 720p), and 1920×1080 pixels (2 megapixels or 1080p).

The virtual exercise interface 225 provides the user 205 with an interactive simulation with which the user 205 may interact via the camera 215 to execute a virtual activity comprising exercises such as rehabilitation exercises. The virtual activity may be in the form of visual instructions, e.g. a model of a human showing how to perform a movement or exercise, in the form of a game, in the form of written instructions, and/or the like.

For example, a given element of a simulation may be controlled by a given body part of the user 205. While the virtual activity or simulation is displayed on the display unit of the client device 210 to the user 205, the user 205 executes an exercise during which he moves his given body part. A 2D motion tracking procedure 260 executed by the server 220 or the client device 210 tracks the movement of the given body part as imaged by the camera 215 and transmits the position of the given body part to the virtual activity generation procedure 250.

The virtual activity generation procedure 250 executed by the server 220 or the client device 210 modifies a characteristic/property of the given element of the simulation in a virtual environment or virtual space substantially in real time as a function of the new position of the given body part received from the 2D motion tracking procedure 260, thereby rendering the simulation interactive. For example, the position of the given element may be changed in virtual space according to the change of position of the tracked body part. A position correction procedure 270 and a distance correction procedure 280 may be executed by the server 220 or the client device 210 prior to and/or concurrently with the 2D motion tracking procedure 260 to correct what is tracked in 2D by the 2D motion tracking procedure 260.

Server

The server 220 is configured to inter alia: (i) receive images and/or videos comprising at least a portion of a body 207 of a user 205 from the camera 215; (ii) substantially continuously track, determine and correct the position of at least a portion of the body 207 of the user 205 in 2D in the received images and/or videos; (iii) generate, update and display a virtual exercising environment in response to the tracking of the position of the at least portion of the body 207 of the user 205.

In one or more embodiments, to achieve that purpose, the server 220 executes inter alia the virtual activity generation procedure 250, the 2D motion tracking procedure 260, the position correction procedure 270, and the distance correction procedure 280, which may be displayed in a virtual exercise interface 225 accessible to the client device 210. How the server 220 is configured to do so will be explained in more detail herein below.

It will be appreciated that the server 220 can be implemented as a conventional computer server and may comprise at least some of the features of the electronic device 100 shown in FIG. 1. In a non-limiting example of one or more embodiments of the present technology, the server 220 is implemented as a server running an operating system (OS). Needless to say that the server 220 may be implemented in any suitable hardware and/or software and/or firmware or a combination thereof. In the disclosed non-limiting embodiment of present technology, the server 220 is a single server. In one or more alternative non-limiting embodiments of the present technology, the functionality of the server 220 may be distributed and may be implemented via multiple servers (not shown).

The implementation of the server 220 is well known to the person skilled in the art. However, the server 220 comprises a communication interface (not shown) configured to communicate with various entities (such as the database 230, for example and other devices potentially coupled to the communication network 240) via the communication network 240. The server 220 further comprises at least one computer processor (e.g., the processor 110 of the electronic device 100) operationally connected with the communication interface and structured and configured to execute various processes to be described herein.

In one or more embodiments, the functionality of the server 220 as described herein may be executed by another processing device such as the client device 210.

Database

A database 230 is communicatively coupled to the server 220 and the client device 210 via the communications network 240 but, in one or more alternative implementations, the database 230 may be communicatively coupled to the server 220 without departing from the teachings of the present technology. Although the database 230 is illustrated schematically herein as a single entity, it will be appreciated that the database 230 may be configured in a distributed manner, for example, the database 230 may have different components, each component being configured for a particular kind of retrieval therefrom or storage therein.

The database 230 may be a structured collection of data, irrespective of its particular structure or the computer hardware on which data is stored, implemented or otherwise rendered available for use. The database 230 may reside on the same hardware as a processor that stores or makes use of the information stored in the database 230 or it may reside on separate hardware, such as on the server 220. The database 230 may receive data from the server 220 for storage thereof and may provide stored data to the server 220 for use thereof.

In one or more embodiments of the present technology, the database 230 is configured to store inter alia: (i) configuration parameters of the camera 215; (ii) configuration parameters of the virtual exercise interface 225; (iii) parameters relating to the user 205; and (iv) parameters relating to each of the 2D motion tracking procedure 260, the position correction procedure 270, the distance correction procedure 280, and the virtual activity generation procedure 250.

Communication Network

In one or more embodiments of the present technology, the communications network 240 is the Internet. In one or more alternative non-limiting embodiments, the communication network 240 may be implemented as any suitable local area network (LAN), wide area network (WAN), a private communication network or the like. It will be appreciated that implementations for the communication network 240 are for illustration purposes only. How a communication link 245 (not separately numbered) between the client device 210, the server 220, the database 230, and/or another electronic device (not shown) and the communications network 240 is implemented will depend inter alia on how each electronic device is implemented.

2D Motion Tracking Procedure

Figure 3:
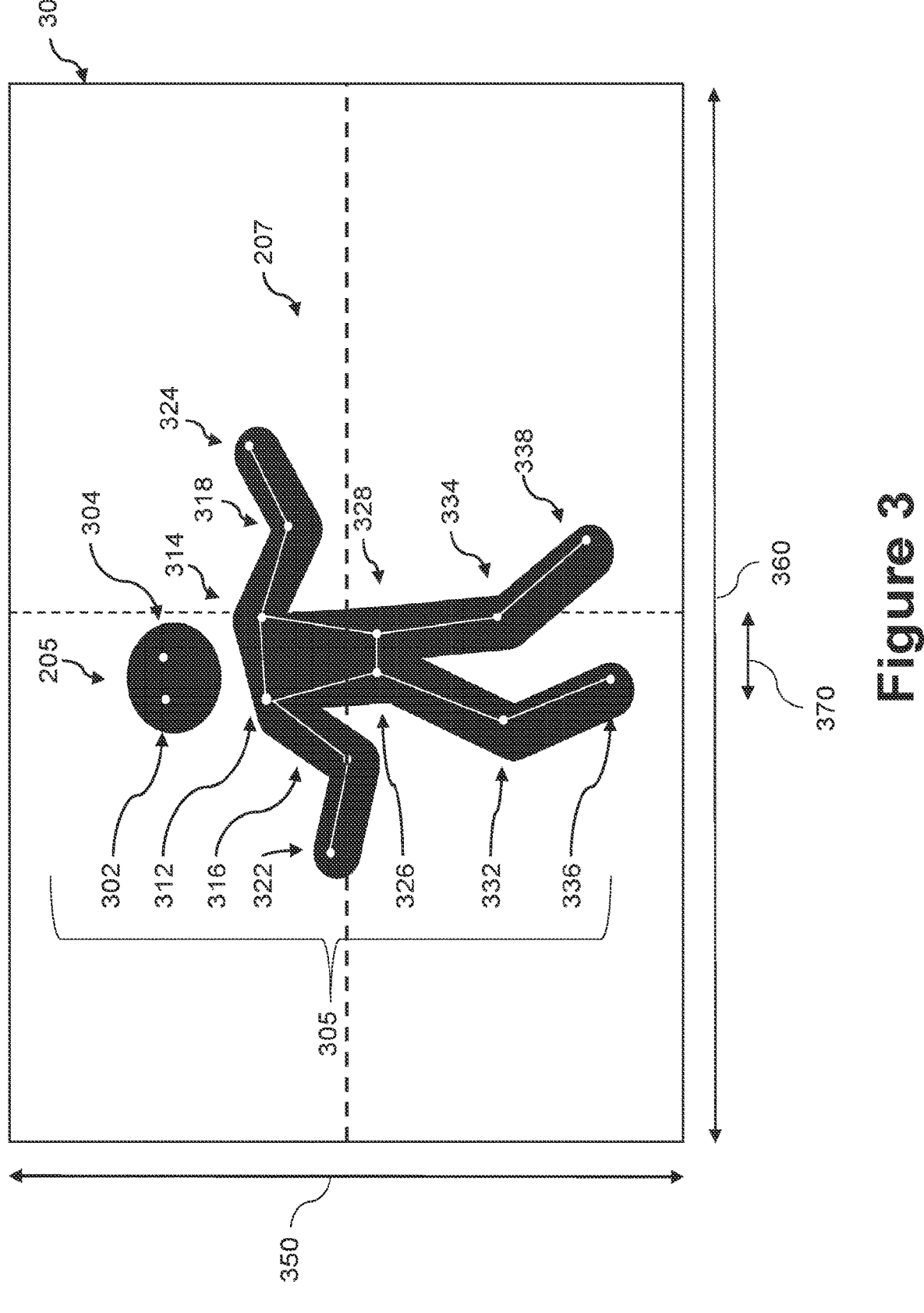
FIG. 3 depicts a schematic diagram of a set of points tracked by the 2D motion tracking procedure in an image, in accordance with one or more non-limiting embodiments of the present technology.

With reference to FIG. 3, there is shown a schematic diagram of an image 300 of the user 205 captured by the camera 210 and tracked via the 2D motion tracking procedure 260 in accordance with one or more non-limiting embodiments of the present technology.

The 2D motion tracking procedure 260 is configured to substantially continuously track and determine the position of at least a portion of the body 207 of the user 205 as imaged by the camera 215.

The 2D motion tracking procedure 260 is configured to represent the position of the body 207 of the user 205 in image coordinates with respect to the field of view imaged by the camera 215, which may be then converted in virtual space coordinates, such that movements performed by the user 205 are translated into corresponding movements in virtual space.

In one or more embodiments, the 2D motion tracking procedure 260 is configured to normalize the coordinate space of the image 300, such that the coordinates of images acquired by the camera 215 extend from −1 to 1 vertically and −1 to 1 horizontally, and the center of the image 300 is located at coordinates (0,0). This enables simplifying tracking of the movements of the body 207 of the user 205, however this does not need to be so in every embodiment of the present technology.

As a non-limiting example, for an image of size 1920× 1080 pixels, the 2D motion tracking procedure 260 normalizes the coordinates such that the center of the image located at pixels (960,540) corresponds to position (0,0) in a normalized space.

The 2D motion tracking procedure 260 detects, within the image 300, the position of a set of points 305 on at least a portion the body 207 of the user 205 in 2D, and then tracks movement of the set of points 305 in 2D space during a virtual activity chosen by the user 205 or by a medical professional for example.

It will be appreciated that different techniques may be used to detect the set of points 305. In one or more embodiments, the 2D motion tracking procedure 260 has access to machine learning algorithms (MLAs) having been trained to detect and track body parts In one or more embodiments, the set of points 305 may correspond to the position of a set of joints of the body of the user 205. It will be appreciated that the set of points 305 may not be directly positioned on joints of the user 205 but on other locations on the body of the user 205. The position of each of the set of points 305 may be expressed in pixels in the form (x,y) with respect to the center of the image 300 captured by the camera 215.

The set of points 305 are connected by lines representing different limbs of the body 207 such that a 2D skeleton of the user 205 is represented. It will be appreciated that that different types of geometrical shapes may be used to represent the body 207 of the user 205.

As a non-limiting example, as illustrated in FIG. 3, the set of points 305 comprises a position of: the left and right eyes 302, 304, the left and right shoulders 312, 314, the left and right elbows 316, 318, the left and right hands 322, 324, the left and right hips 326, 328, the left and right knees 332, 334, and the left and right foot 336, 338 of the user 205.

The 2D motion tracking procedure 260 is configured to track the movement of the set of points 305 by determining differences in the location of the set of points 305 after a predetermined number of frames, which is then transmitted to the virtual activity generation procedure 250, which updates the virtual environment in response to the tracked movements.

It will be appreciated that since the camera 215 acquires 2D images, the 2D motion tracking procedure 260 may not reliably track physical movements in 3D space, because the absolute pixel positions of the joints identified would be variable depending on the relative position of the user 205 with respect to the camera 215, and/or the camera's 215 field of view.

Prior to providing the user 205 with a virtual exercise interface such as the virtual exercise interface 402, 404 where the user 205 performs movements, the 2D motion tracking procedure 260 is configured to perform a position correction procedure 270.

Position Correction Procedure

The position correction procedure 270 is configured to normalize a position of the user 205 with respect to the camera 215, such that a given movement of the body 207 of the user 205 located further away from the camera 215 corresponds to the same movement of the user 205 if the user 205 was located closer to the camera 215 when tracked by the 2D motion tracking procedure 260.

Figure 5:
FIG. 5 depicts a schematic diagram of two images of a user performing the same lateral arm movement at different distances from the camera, in accordance with one or more non-limiting embodiments of the present technology.
Figure 5:
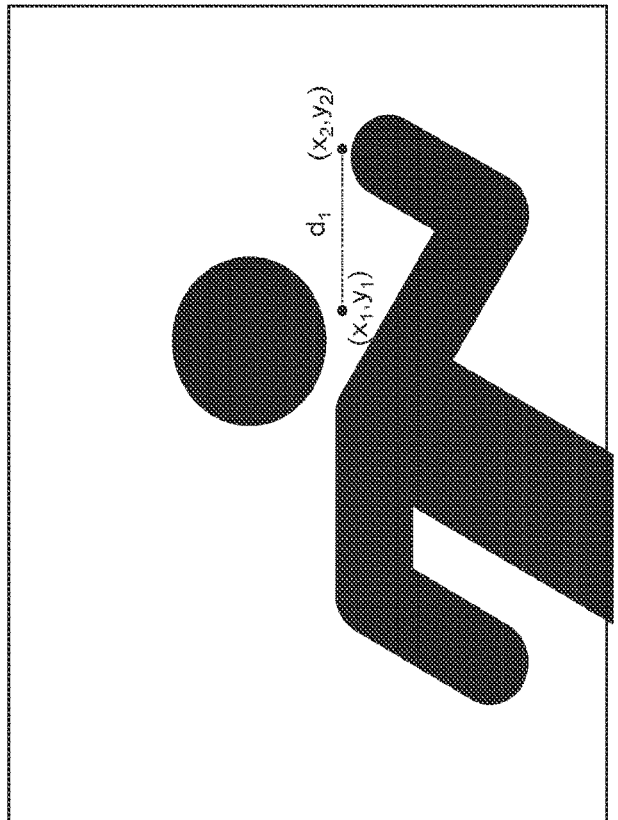

As illustrated in FIG. 5, it will be appreciated that if the user 205 is located at 1 m from the camera 215 and performs a lateral movement such as moving his left hand laterally, the 2D motion tracking procedure 260 may track the position of the left hand moving from coordinates $(x_1,y_1)$ to coordinate $(x_2,y_2)$ resulting in a lateral displacement of distance $d_1$. If the user 205 is located at 2 m from the camera 215 and performs the same lateral movement of the left hand, the 2D motion tracking procedure 260 may track the position of the left hand moving from coordinates $(x_3,y_3)$ to coordinate $(x_4,y_4)$ resulting in a lateral displacement of distance $d_2$. Without the position correction procedure 270, due to the distance of the user 205 from the camera 215 and/or the field of view of the camera 215, the 2D motion tracking procedure 260 would calculate the distance $d_1$ as being greater than distance $d_2$, which would translate into a greater movement in virtual space, even though the user 205 perform the same lateral movement.

Thus, the position correction procedure 270 is configured to correct or normalize the position of the user 205 such that the same movement in space translates into the same movement in virtual space regardless of the distance the user is located from the camera 215.

The position correction procedure 270 receives an image of the user 205, such as the image 300. The image 300 has a height 350 and a width 360 in pixels for example.

It will be appreciated that the height 350 and the width 360 depend inter alia on the sensors and the optics of the camera 215.

The height 350 and the width 360 may be converted into normalized coordinates such that the center of the image 300 is located at coordinates (0,0).

As a non-limiting example, if the image 300 has a (500,500) pixel resolution, it may not be clear that (250,250) is the center of the image when working with the data. The normalization allows for a mapping from the image space

16

370 is vertical, the position correction procedure 270 uses the height 350 of the image 300.

The reference ratio is mapped to a virtual object in virtual space, where the virtual objects has coordinates in virtual space. The reference ratio is used to normalize movements of the user 205, such that if the user 205 performs a movement and the reference ratio is below a threshold, the movement of the corresponding object is scaled up in virtual space, and if the reference ratio is above a threshold, the movement of the object is scaled down in virtual space.

In one or more embodiments, the image coordinates of the image 300 are normalized using the following pseudocode:

```
RawRangeXmin = 0 and RawRangeXmax = xImageResolutionmmmm
RawRangeX = RawRangeXmax − RawRangeXmin
RawRangeYmin = 0 and RawRangeYmax = yImageResolution
RawRangeY = RawRangeYmax − RawRangeYmin
NormalizedRangeXmin = −1 and NormalizedRangeXmax=1
NormalizedRangeX = NormalizedRangeXmax − NormalizedRangeXmin
NormalizedRangeYmin = −1 and NormalizedRangeYmax=1
NormalizedRangeY = NormalizedRangeYmax − NormalizedRangeYmin
        NormalizedPosX = [PixelJointPosX − RawRangeXmin] *
NormalizedRangeX / RawRangeX + NormalizedRangeXmin;
        NormalizedPosY = [PixelJointPos Y − RawRangeYmin] *
NormalizedRangeY / RawRangeY + NormalizedRangeYmin;
        NormalizedPosXY = [(PixelJointPosX,PixelJoinPosY)−(0,0)] *
(NormalizedRangeX,NormalizedRangeY);
```

(250, 250) to the normalized space (0, 0). In one or more other embodiments, normalization of the image coordinates may be performed implicitly at subsequent steps.

The position correction procedure 270 obtains the set of points 305 tracked on the body 207 of the user 205.

The position correction procedure 270 determines a reference body length by determining a distance between two points of the set of points 305. The reference body length may include a horizontal distance and/or a vertical distance between two points.

As a non-limiting example, the position correction procedure 270 determines a distance between the left and right shoulders 312, 314 of the user 205. It will be appreciated that the reference body length 370 may be determined directly in normalized coordinate space or converted to a normalized where: RawRangeX and RawRangeY correspond to the range of the image 300, and it will be appreciated that the values of the RawRangeXMin and RawRangeYmin may be set by an operator (0 by convention) and yImageResolution corresponds to the height 350 and xImageResolution corresponds to the width 360 of the image 300. NormalizedRangeXmin,Normalize-dRangeXmax,NormalizedRangeYmin, Normalize-dRangeYmax may be set by an operator (e.g. −1 to 1 in this example, but could be 0 to 1 in other embodiments). PixelJointPosX and PixelJointPosY correspond to the horizontal coordinates and vertical coordinates of a point of the set of points 305, respectively.

As a non-limiting example, for an image of a resolution of 1920×1080 pixels and a joint position at pixels (250, 250), the following pseudocode may be used:

```
PixelJointPos = (PixelJointPosX,PixelJointposY)=(250,250)
NormalizedRange = (NormalizedRangeX,NormalizedRangeY)=(2,2)
RawRange = (RawRangeX,RawRangeY)=(1920,1080)
NormalizedPosXY = [(PixelJointPosX,PixelJoinPosY)−
(0,0)]*(NormalizedRangeX,NormalizedRangeY) = (250,250)*(2,2)/(1920,1080)+(−1,−1)
= (−0.740,−0.537)
``` coordinate space, however this does not need to be so in every embodiment of the present technology.

The position correction procedure 270 obtains a reference ratio based on the reference body length 370 and one of the height 350 and the width 360 of the image 300. In one or more embodiments, the reference ratio is obtained by dividing the reference body length 370 by one of the height 350 and the width 360 of the image 300. The reference ratio indicates how much space the body 207 of the user 205 takes relative to the field of view of the camera 215.

It will be appreciated that if the reference body length 370 is horizontal, the position correction procedure 270 uses the width 360 of the image 300, and if the reference body length In one or more embodiments, the position correction procedure 270 determines a normalized ratio using the following equation:

ScaledPos=NormalizedPos/ReferenceBodyPartLength

In one or more embodiments, the scaled position is defined as a range comprising a minimum scaled position and a maximum scaled position. The scaled range is determined based on the set of points 305 corresponding to joints used to calculate the reference body length.

In one or more embodiments, the position correction procedure 270 determines a virtual space range including a minimum virtual space range and a maximum virtual space range. The virtual space range may be defined to any range and is selected based on the range in virtual space that the virtual object will be moving in. The virtual space range may be determined in the horizontal direction and/or in the vertical direction.

It will be appreciated that coordinates in virtual space may depend on the resolution of the virtual environment generated by the virtual exercise generation procedure 250.

The position correction procedure 270 scales the scaled position to virtual space using the following equation:

$$OriginalRange = MaxScaledPos - MinScaledPos$$

$$VirtualRange = MaxVirtual\ Space - MinVirtual\ Space$$

$$VirtualPos = (ScaledPos - MinScaledPos)*VirtualRange/OriginalRange + MinVirtual\ Space;$$

where VirtualPos is the final position that is used for the position of the object corresponding to the set of points in virtual space.

The 2D motion tracking procedure 260 is executed concurrently with the virtual activity generation procedure 250.

Distance Detection Procedure

The distance detection procedure 280 is configured to determine approximately the distance between the user 205 and the camera 215 during the virtual activity and provide feedback to the user 205 such that the user 205 is always located within a target distance of the camera 215. The purpose of the distance detection procedure 280 is to ensure that the user 205 can perform movements within the field of view of the camera 215 during a virtual activity.

The manner in which the target distance is determined is not limited, and may depend on environment of the user 205, as well as the virtual activity.

The distance detection procedure 280 obtains the set of points 305 tracked on the body 207 of the user 205.

The distance detection procedure 280 determines a reference body length by determining a distance between two points of the set of points 305. The reference body length 370 may include a horizontal distance and/or a vertical distance.

As a non-limiting example, the distance detection procedure 280 may determine a distance between the left and right shoulders 312 and 314 of the user 205. It will be appreciated that the reference body length 370 may be determined in or converted to normalized coordinates. As a non-limiting example, the distance detection procedure 280 may determine the length of the vector between the left and right shoulders 312 and 314. The reference body length 370 represents the width occupied by the user 205.

The distance detection procedure 280 determines a width ratio based on the reference body length 370 and the width 360 of the image 300. The width ratio may be determined in normalized coordinate space.

As a non-limiting example, in the normalized space where the width 360 of the image 300 ranges from −1 to 1, the reference body length 370 may be of 0.4, and the width ratio may be equal to 20%.

Each virtual activity is associated with a threshold width, which corresponds to the maximum amount of screen width that the user 205 may occupy during the given activity. It will be appreciated that larger values of the threshold width enable the user 205 to occupy a larger portion of the screen during the activity.

In one or more embodiments, if the user 205 has been detected as being in position in a previous image, i.e., within the threshold width, the distance detection procedure 280 is configured to increase the threshold width by a predetermined amount to account for fluctuations in the coordinates. In one or more embodiments, the threshold width may be increased by 25%. It will be appreciated that the increase of the threshold may be optional.

In one or more embodiments, the distance correction procedure 280 uses the following pseudocode:

PlayerWidth = Magnitude(shoulderLeft − shoulderRight)
WidthAligned = PlayerWidth < wThreshhold (x1.25 if previously in position)

The distance detection procedure 280 is configured to ensure that the camera 215 is positioned correctly such that the required movement of the user 205 during the virtual activity can be detected and tracked by the 2D motion tracking procedure 260. As a non-limiting example, if the user 205 has to extend the left and right arms horizontally during a given activity, the distance correction procedure 280 ensures that the camera 215 and the 2D motion tracking procedure 260 can detect the extension of the left and right arms within the field of view when the user 205 performs movements.

The distance correction procedure 280 receives a position of the head of the user 205. In one or more embodiments, the position of the head may be obtained as a non-limiting example by detecting the left and right eyes 302, 304 of the user 205 and calculating an average of the coordinates of the eyes.

In one or more embodiments, the distance correction procedure 280 is configured to determine if the horizontal position of the head 302 is within a predetermined horizontal range of the center of the image 300, i.e., near the zero horizontal coordinate in normalized coordinate space. It will be appreciated that the allowed horizontal range may be predetermined based on the field of view of the camera 215 and the environment of the user 205, however this does not need to be so in every embodiment of the present technology.

In one or more embodiments, the predetermined horizontal range depends on the type of virtual activity, where depending on the type of movements required from the user 205 during the virtual activity, the horizontal space needed on the left side and the right of the head the user 205 may vary.

The distance correction procedure 280 is configured to determine if the vertical position of the head 302 is within a predetermined vertical range.

In one or more embodiments, the predetermined vertical range depends on the type of virtual activity, where depending on the type of movements required from the user 205 during the activity, the vertical space needed above the head of the user 205 and below the head of the user 205 may vary.

In one or more embodiments, the predetermined horizontal range and/or the predetermined vertical range is associated with a buffer which varies in function of a distance of the user 205 from the camera 215, to take into account that the user 205 located further away from the camera 215 has more space to move vertically and/or horizontally than the user 205 located closer to the camera 215.

The buffer may be determined based on a width 360 of the image 300, the reference body length of the user 205 and a predetermined interval. The predetermined interval may be interpreted as a "wiggle" room for the user 205 to move.

The distance correction procedure 280 determines if user 205 is aligned horizontally by comparing the horizontal position of the head 302 of the user 205 with a predetermined horizontal value and the buffer.

The distance correction procedure 280 determines if the user 205 is aligned vertically by comparing the vertical position of the head 302 of the user 205, a predetermined vertical value and the buffer.

In one or more embodiments, the distance correction procedure 280 uses the following equation:

$$WiggleBuffer = (ScreenWidth - PlayerWidth)*MaxWiggleRoom$$

$$HorizontalAligned = AbsoluteValue(HeadPosition.X)$$
$$< XWiggle + WiggleBuffer$$

$$VerticalAligned = AbsoluteValue(HeadPosition.Y - TargetYPosition) < YWiggle + WiggleBuffer$$

Where the WiggleBuffer is the horizontal range.

If the distance correction procedure 280 determines that the user 205 is within each of the vertical range and the horizontal range, the distance correction procedure 280 ends.

If the distance correction procedure 280 determines that the user 205 is not within at least one of the vertical range and the horizontal range, the distance correction procedure 280 provides feedback to the user 205.

It will be appreciated that feedback to the user 205 may be provided in different ways. In one or more embodiments, the feedback may be provided on a screen of the client device 210 by displaying instructions indicating that the user 205 should move further away from the camera 215 or closer to the camera 215.

Figure 6:
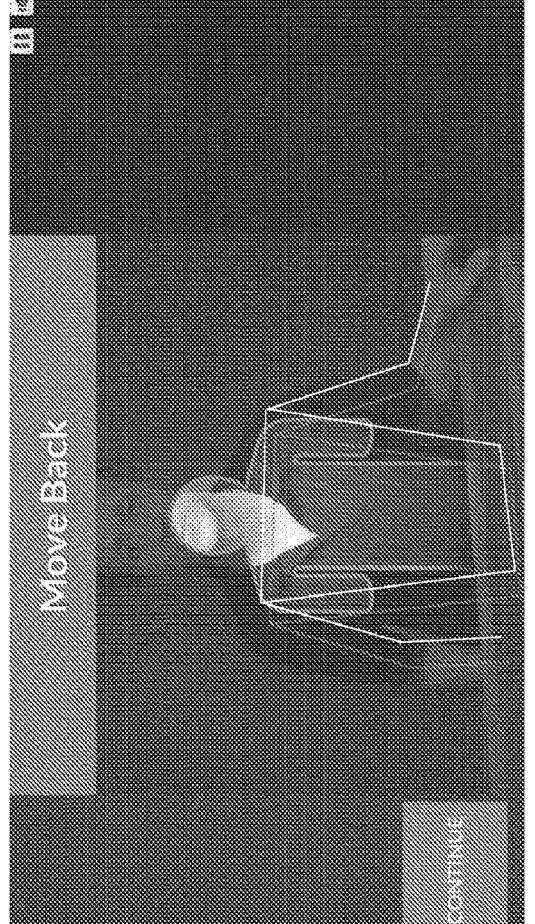
FIG. 6 depicts screenshots of a user interface with a contour instructing the user to move, in accordance with one or more non-limiting embodiments of the present technology.
Figure 6:
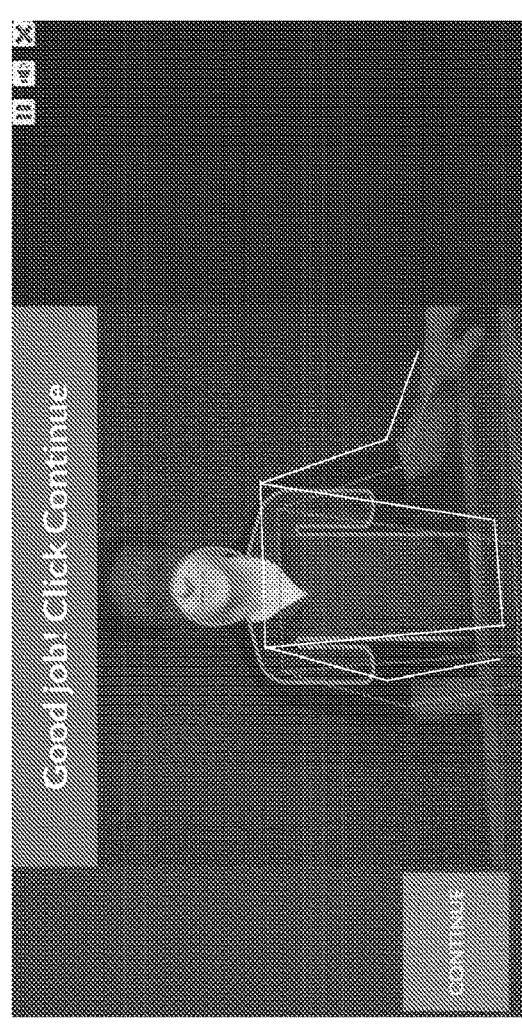

In one or more embodiments, the feedback is provided on the screen of the client device 215 by displaying a silhouette of a user such that the user 205 may move to align himself or herself within the silhouette. FIG. 6 illustrates a non-limiting example of a silhouette with instructions displayed on the user interface 225.

In one or more alternative embodiments, the feedback may be provided via an audio interface of the client device 210 in the form of an audio signal, as a non-limiting example spoken instructions or other types of sounds.

In one or more other embodiments, the distance correction procedure 280 may determine a distance of the user 205 from the camera 215 based on an average real-world shoulder width of the user 205 and field-of-view angle of the camera 215. The distance correction procedure 280 may then compare the determined distance with a predetermined distance to determine if the user 205 is located close or far enough to the camera 215 to enable the 2D motion tracking procedure 260 to track the user 205.

Once the distance correction procedure 280 ends, the 2D motion tracking procedure 260 and the virtual activity generation procedure 250 are executed. It will be appreciated that the distance correction procedure 280 may be executed in background during the virtual activity, or executed after a predetermined period of time, or prior to any virtual activity.

Virtual Exercise Environment

Figure 4:
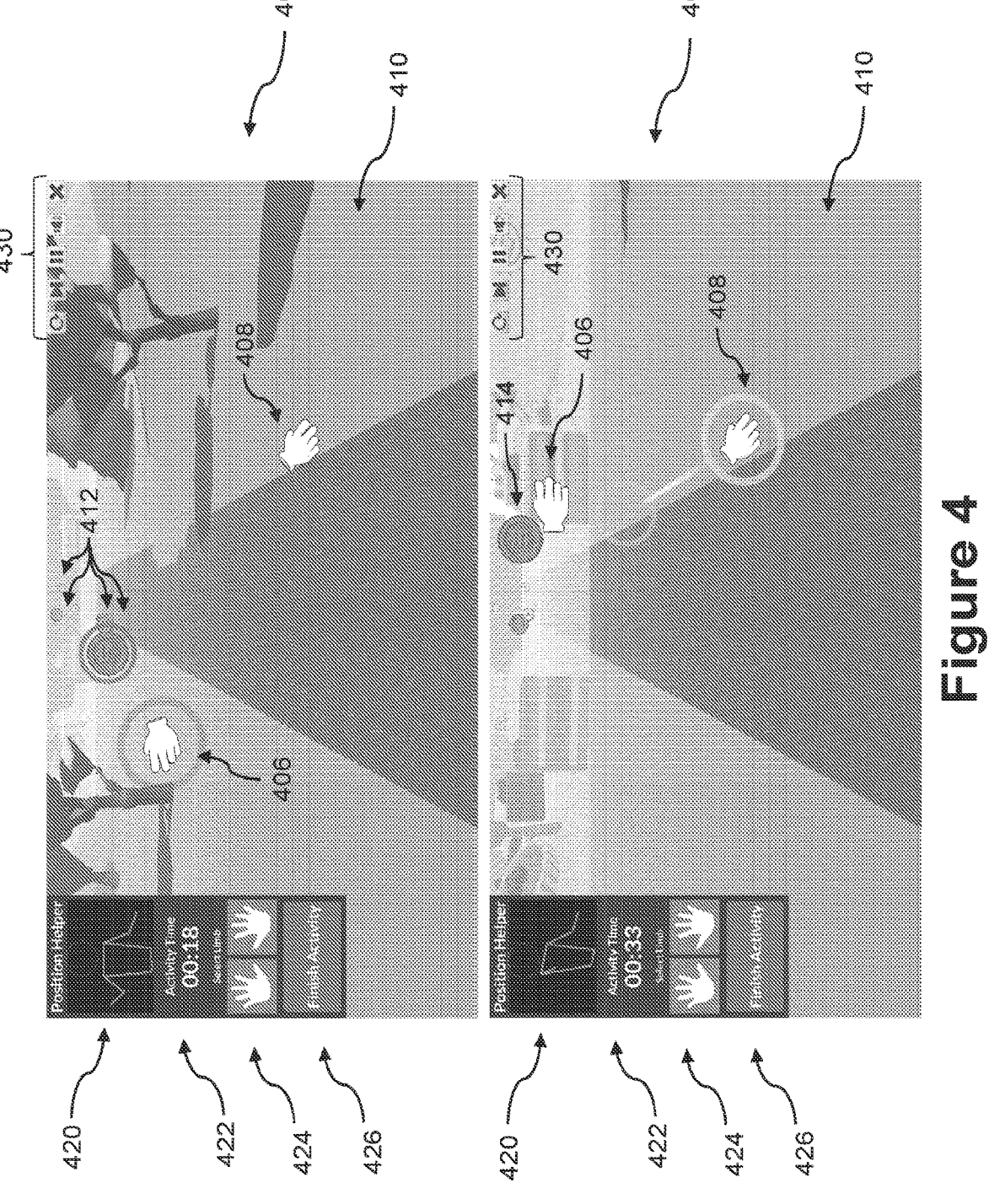
FIG. 4 depicts a schematic diagram of a virtual exercise interface at two moments in time, in accordance with one or more non-limiting embodiments of the present technology.

Now turning to FIG. 4, there is shown a virtual exercise interface 402, 404 at two different moments or points in time in accordance with one or more non-limiting embodiments of the present technology.

The virtual exercise interface 402, 404 is generated by the server 220. In one or more other embodiments, the virtual exercise interface 402, 404 is generated by the client device 210.

The virtual exercise interface 402, 404 is an interactive graphical interface providing the user 205 with exercise means where the user 205 interacts with the virtual exercise interface 402, 404 by performing movements in front of the camera 215, which are tracked by the 2D motion tracking procedure 260.

The virtual activity generation procedure 250 receives substantially continuously the position of at least a portion of the body 207 of the user 205 within the 2D space from the 2D motion tracking procedure 260 and is adapted to generate and update the virtual exercise interface 402, 404 in response to the tracked movements.

The virtual exercise interface 402, 404 is associated with a specific activity and a level of difficulty. The specific activity is associated with a set of movements which the user 205 may perform using his body 207.

It will be appreciated that the virtual activity generation procedure 250 may provide different types of virtual environments associated with different types of movements for different parts of the body for engaging the user 205 in physical activity The virtual exercise interface 402, 404 comprises a virtual interactive environment 410, control buttons 430, a position helper 420, an activity timer 422, a limb selector 424, and a finish activity button 426.

The virtual interactive environment 410 comprises a background scene in the form of a landscape with a road where virtual objects 412, 414 in the form of coins are located at different positions there along, and two virtual hands representing the left and right hands of the user 205 must move to collect the virtual objects 412, 414.

In one embodiment, the background scene is a 2D or 3D computer graphic or image to be displayed to the user 205. The position of the virtual representation of the body 207 within the background scene is set as a function of the received tracked body parts of the user 205 via the 2D motion tracking procedure 260.

In one or more embodiments, the virtual representation of the body part of the user 205 is shaped as the body part. e.g. it mimics the shape of a human arm, leg, or hand. In one or more other embodiments, the virtual representation of the body part may be any other type of representation such as an object, an animal, a dot, and or the like.

In one or more embodiments, the background scene during the virtual activity may only comprise a background image having fixed virtual elements, i.e. none of the elements constituting the background scene may be moved, while the virtual representation of the body part may move within the background scene. For example, the background scene may comprise a first and a second reference marks or points which have a fixed position.

In one or more embodiments, the virtual activity generation procedure 250 comprises a database of background scenes. In this case, the virtual activity generation procedure 250 is adapted to retrieve a particular scene from the database and insert the virtual representation of the hand within the particular scene.

The control buttons 430 enable the user 205 or an operator such as a medical professional to restart the virtual activity, to advance the virtual activity, to pause the virtual activity and to exit the virtual activity.

The 2D motion tracking procedure 260 tracks the current position of the upper body of the user 205 by tracking a set of points on the body 207 of the user 205 as can be seen in the position helper 420. The position helper 420 provides feedback to the user 205 with regard to the current position of his body, and enables the user 205 to "see" what the set of points tracked by the 2D motion tracking procedure 260.

The user 205 moves his hands and body to collect the virtual objects 412, 414 along the virtual road of the virtual interactive environment 410.

The virtual interactive environment 410 provides feedback to the user 205 when the user 205 successfully collects a virtual object 412, 414. As a non-limiting example, the virtual interactive environment 410 may count the number of virtual objects 412, 414 the user 205 has collected (not depicted), which may enable the user 205 to advance to a different activity, level of difficulty, obtain a prize, or the like.

The activity timer 422 displays the time the user 205 has spent performing the virtual activity.

The limb selector 424 enables the user 205 to change the limbs used in the activity and/or to change the virtual representation of the limbs.

The finish activity button 426 enables the user 205 to end the activity and to return to a menu.

Method Description

FIG. 7 depicts a flow chart of a method of 2D motion tracking position correction in accordance with one or more non-limiting embodiments of the present technology.

In one or more embodiments, the server 220 comprises a processor 110 and a non-transitory computer readable storage medium such as the solid-state drive 120 and/or the random-access memory 130 storing computer-readable instructions. The processor 110, upon executing the computer-readable instructions, is configured to execute the method 700

The method 700 begins at processing step 702.

At processing step 702, the processor 110 receives, from the camera 215, an image 300, the image comprising at least a portion of body 207 of a subject 205, the subject 205.

At processing step 704, the processor 110 detects a first point and a second point on the at least portion of the body 207 of the subject 205 in the image 300. The processor 110 may execute a machine learning algorithm (MLA) having been trained to detect body parts. In one or more embodiments, the processor 110 detects a set of points 305 which may approximately correspond to body joints of the user 205.

At processing step 706, the processor 110 determines a distance between the first point and the second point on the at least portion of the body 207 of the subject 206. In one or more embodiments, the processor 110 determines a reference body length by determining the distance between the first point and the second point. As a non-limiting example, the first and the second point may comprise the left and right shoulders 312, 314 of the user 205.

At processing step 708, the processor 110 calculates, based on the reference distance and the at least one of a height 350 of the image 300 and a width 360 of the image 300, a reference ratio. In one or more embodiments, the processor 110 normalizes coordinates of the image 300 such that each of the height 350 and the width 360 extend from [−1,1].

At processing step 710, the processor 110 mapping, based on the reference ratio, the first point and the second point into virtual space to obtain a first virtual point and a second virtual point respectively.

In one or more embodiments, the processor 110 determines a virtual space range including a minimum virtual space range and a maximum virtual space range. The virtual space range may be defined to any range and is selected based on the range in virtual space that the virtual object will be moving in. The virtual space range may be determined in the horizontal direction and/or in the vertical direction.

At processing step 712, the processor 110 detects a movement of the at least portion of the body 306 in another image.

At processing step 714, the processor 110 maps based on the reference ratio, the first virtual point and the second virtual point, the movement of the at least one of the first point and the second point to a movement of a corresponding one of the first virtual point and the second virtual point in virtual space.

In one or more embodiments, the mapping is further based on the virtual space range.

At processing step 716, the processor 110 outputting, on a display interface 140 of the client device 210, the movement of the corresponding one of the first virtual point and the second virtual point in virtual space.

The method 700 then ends.

FIG. 8 depicts a flow chart of a method of 2D motion tracking distance correction in accordance with one or more non-limiting embodiments of the present technology.

In one or more embodiments, the server 220 comprises a processor 110 and a non-transitory computer readable storage medium such as the solid-state drive 120 and/or the random-access memory 130 storing computer-readable instructions. The processor 110, upon executing the computer-readable instructions, is configured to execute the method 800

The method 800 begins at processing step 802.

At processing step 802, the processor 110 receives, from the camera 215, an image 300, the image comprising at least a portion of body 207 of a subject 205, the subject 205.

At processing step 804, the processor 110 detects a first point and a second point on the at least portion of the body 207 of the subject 205 in the image 300. The processor 110 may execute a machine learning algorithm (MLA) having been trained to detect body parts. In one or more embodiments, the processor 110 detects a set of points 305 which may approximately correspond to body joints of the user 205.

At processing step 806, the processor 110 determines a distance between the first point and the second point on the at least portion of the body 207 of the subject 206. In one or more embodiments, the processor 110 determines a reference body length by determining the distance between the first point and the second point. As a non-limiting example, the first and the second point may comprise the left and right shoulders 312, 314 of the user 205.

At processing step 808, the processor 110 calculates, based on the reference distance and the at least one of a height 350 of the image 300 and a width 360 of the image 300, a reference ratio. In one or more embodiments, the processor 110 normalizes coordinates of the image 300 such that each of the height 350 and the width 360 extend from [−1,1].

At processing step 810, the processor 110 receives a target reference ratio associated with a given virtual activity. In one or more embodiments, the user 205 selects a virtual activity or exercises using the virtual exercise interface 225, which is associated with a target reference ratio.

At processing step 812, in response to the reference ratio being equal to the target reference ratio, the processor 110 receives a third point on the at least portion of the body 207 of the subject 205. As a non-limiting example, the third point may be position of the head of the user 205. The position of the head by detecting the left and right eyes 302, 304 of the user 205 and calculating an average of the coordinates of the eyes.

At processing step 814, the processor 110 receives a target range associated with the given virtual activity for the third point.

At processing step 816, in response to the third point being within the target range, the processor 110 initializes the virtual activity. The target range comprises a target predetermined horizontal range and a target predetermined vertical range.

In one or more embodiments, the processor 110 determines if the horizontal position of the head 302 is within a predetermined horizontal range of the center of the image 300, i.e. near the 0 horizontal coordinate in normalized coordinate space. In one or more embodiments, the processor 110 determines if the vertical position of the head 302 is within a predetermined vertical range.

The method 800 then ends.

It should be expressly understood that not all technical effects mentioned herein need to be enjoyed in each and every embodiment of the present technology. For example, embodiments of the present technology may be implemented without the user enjoying some of these technical effects, while other non-limiting embodiments may be implemented with the user enjoying other technical effects or none at all.

Some of these steps and signal sending-receiving are well known in the art and, as such, have been omitted in certain portions of this description for the sake of simplicity. The signals can be sent-received using optical means (such as a fiber-optic connection), electronic means (such as using wired or wireless connection), and mechanical means (such as pressure-based, temperature based or any other suitable physical parameter based).

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for tracking a subject using a 2D camera, the method being executed by a processor operatively connected to the 2D camera, the method comprising:
   receiving, from the 2D camera, a first 2D image comprising at least a portion of a body of the subject;
   detecting a first point and a second point on the at least a portion of the body of the subject in the first 2D image;
   determining a reference distance between the first point and the second point in the first 2D image;
   calculating a reference ratio based on the reference distance and at least one of a height of the first 2D image and a width of the first 2D image;
   mapping, based on the reference ratio, the first point and the second point into a virtual space to obtain a first virtual point and a second virtual point, respectively;
   detecting a movement of at least one of the first point and the second point in a second 2D image;
   mapping, based on the reference ratio, the first virtual point and the second virtual point, the movement of the at least one of the first point and the second point to a movement of a corresponding one of the first virtual point and the second virtual point in the virtual space; and providing for display a visual representation of the movement of the corresponding one of the first virtual point and the second virtual point in the virtual space.

2. A method for tracking a subject in 2D using a 2D camera, the method being executed by a processor operatively connected to the 2D camera, the method comprising:
   receiving, from the 2D camera, a 2D image comprising at least a portion of body of a subject;
   detecting a first point and a second point on the at least portion of the body of the subject in the 2D image;
   determining a reference distance between the first point and the second point in the 2D image;
   calculating a reference ratio based on the reference distance and at least one of a height of the 2D image and a width of the 2D image;
   receiving a target reference ratio associated with a given virtual activity;
   in response to the reference ratio being equal to the target reference ratio:
      receiving a third point on the at least portion of the body of the subject; and
      receiving a target range associated with the given virtual activity for the third point; and
   in response to the third point being within the target range:
      initializing the given virtual activity.

3. The method of claim 2, wherein the first point comprises a first joint on the at least portion of the body and the second point comprises a second joint on the at least portion of the body.

4. The method of claim 2, wherein said calculating the reference ratio comprises converting the reference distance and the at least one of the height of the 2D image and the width of the 2D image in normalized coordinate space.

5. The method of claim 2, further comprising, prior to said receiving the third point on the at least portion of the body of the subject:
   receiving a predetermined interval associated with the given activity; and
   calculating, based on the predetermined interval, the reference distance and the at least one of the height of the 2D image and the width of the 2D image, the target range.

6. The method of claim 2, further comprising, in response to the reference ratio being below the target reference ratio:
   providing, to an output interface connected to the processor, an indication to the subject to move further away from the 2D camera.

7. The method of claim 2, further comprising, in response to the reference ratio being above the target reference ratio:
   providing, to the output interface connected to the processor, an indication to the subject to move closer to the 2D camera.

8. The method of claim 2, further comprising, in response to the third point not being within the target range:
   providing, to the output interface connected to the processor, an indication to the subject to move further away from the 2D camera.

9. The method of claim 2, further comprising, in response to the third point not being within the range:
   providing, to the output interface connected to the processor, an indication to the subject to move the 2D camera.

10. The method of claim 2, wherein the first point comprises a left shoulder position of the subject, the second point comprises a right shoulder position of the subject, and the third point comprises a position of a head of the subject.

11. A system for tracking a subject, the system comprising:

a processor, a 2D camera operatively connected to the processor;

a non-transitory storage medium operatively connected to the processor, the non-transitory storage medium comprising computer-readable instructions;

the processor, upon executing the computer-readable instructions, being configured for:

receiving, from the 2D camera, a first 2D image comprising at least a portion of a body of the subject;

detecting a first point and a second point on the at least portion of the body of the subject in the first 2D image;

determining a reference distance between the first point and the second point in the first 2D image;

calculating a reference ratio based on the reference distance and at least one of a height of the first 2D image and a width of the first 2D image;

mapping, based on the reference ratio, the first point and the second point into a virtual space to obtain a first virtual point and a second virtual point, respectively;

detecting a movement of at least one of the first point and the second point in a second 2D image;

mapping, based on the reference ratio, the first virtual point and the second virtual point, the movement of the at least one of the first point and the second point to a movement of a corresponding one of the first virtual point and the second virtual point in the virtual space; and providing for display a visual representation of the movement of the corresponding one of the first virtual point and the second virtual point in the virtual space.

12. A system for tracking a subject in 2D, the system comprising:

a processor;

a 2D camera operatively connected to the processor; and a non-transitory storage medium operatively connected to the processor, the non-transitory storage medium comprising computer-readable instructions;

the processor, upon executing the computer-readable instructions, being configured for:

receiving, from the 2D camera, a 2D image, the image comprising at least a portion of body of a subject;

detecting a first point and a second point on the at least portion of the body of the subject in the 2D image;

determining a reference distance between the first point and the second point in the 2D image;

calculating a reference ratio based on the reference distance and the at least one of a height of the 2D image and a width of the 2D image;

receiving a target reference ratio associated with a given virtual activity;

in response to the reference ratio being equal to the target reference ratio:

receiving a third point on the at least portion of the body of the subject;

receiving a target range associated with the given virtual activity for the third point; and in response to the third point being within the target range:

initializing the given virtual activity.

13. The system of claim 12, wherein the first point comprises a first joint on the at least portion of the body and the second point comprises a second joint on the at least portion of the body.

14. The system of claim 12, wherein said calculating the reference ratio comprises converting the reference distance and the at least one of the height of the 2D image and the width of the 2D image in normalized coordinate space.

15. The system of claim 12, wherein the processor is further configured for, prior to said receiving the third point on the at least portion of the body of the subject:

receiving a predetermined interval associated with the given activity; and calculating, based on the predetermined interval, the reference distance and the at least one of the height of the 2D image and the width of the 2D image, the target range.

16. The system of claim 12, wherein the processor is further configured for, in response to the reference ratio being below the target reference ratio:

providing, to an output interface connected to the processor, an indication to the subject to move further away from the 2D camera.

17. The system of claim 12, wherein the processor is further configured for, in response to the reference ratio being above the target reference ratio:

providing, to the output interface connected to the processor, an indication to the subject to move closer to the 2D camera.

18. The system of claim 12, wherein the processor is further configured for, in response to the third point not being within the target range:

providing, to the output interface connected to the processor, an indication to the subject to move further away from the 2D camera.

19. The system of claim 12, wherein the processor is further configured for, in response to the third point not being within the range:

providing, to the output interface connected to the processor, an indication to the subject to move the 2D camera.

20. The system of claim 12, wherein the first point comprises a left shoulder position of the subject, the second point comprises a right shoulder position of the subject, and the third point comprises a position of a head of the subject.

* * * * *